US007771762B2

(12) United States Patent
Gao et al.

(10) Patent No.: US 7,771,762 B2
(45) Date of Patent: Aug. 10, 2010

(54) ENZYMATIC PROCESS TO PRODUCE HIGHLY FUNCTIONAL SOY PROTEIN FROM CRUDE SOY MATERIAL

(75) Inventors: Song Gao, Edison, NJ (US); John Westcott Finley, Lansdale, PA (US); Vijay Kumar Arora, Lake Forest, IL (US); Wen-Sherng Chen, Glenview, IL (US); Douglas A. Smyth, Belvidere, NJ (US); Ahmad Akashe, Mundelein, IL (US); Ronald Louis Meibach, Deerfield, IL (US); Ariel S. Cudia, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 12/191,954

(22) Filed: Aug. 14, 2008

(65) Prior Publication Data

US 2008/0299607 A1    Dec. 4, 2008

Related U.S. Application Data

(63) Continuation of application No. 10/877,552, filed on Jun. 25, 2004, now abandoned, which is a continuation-in-part of application No. 09/939,500, filed on Aug. 23, 2001, now Pat. No. 6,787,173, and a continuation-in-part of application No. 10/655,158, filed on Sep. 4, 2003, now abandoned, and a continuation-in-part of application No. 10/655,259, filed on Sep. 4, 2003, now Pat. No. 7,045,163.

(60) Provisional application No. 60/250,228, filed on Nov. 30, 2000.

(51) Int. Cl.
*C12P 21/06* (2006.01)

(52) U.S. Cl. .......................... 426/46; 426/656; 426/634

(58) Field of Classification Search ................ 426/656, 426/634, 46
See application file for complete search history.

(56) References Cited

U.S. PATENT DOCUMENTS 4,431,629 A * 2/1984 Olsen ........................ 426/46

FOREIGN PATENT DOCUMENTS

| WO | WO 9211771 | * | 7/1992 |
| WO | WO 03041510 | * | 3/2003 |

* cited by examiner

*Primary Examiner*—Anthony Weier
(74) *Attorney, Agent, or Firm*—Fitch, Even, Tabin & Flannery

(57) ABSTRACT

This invention relates generally to the processing of soy-derived materials for use in various products. More particularly, the invention relates to a process producing highly functional soy protein using ultrafiltration followed by an enzymatic treatment.

18 Claims, 3 Drawing Sheets

US 7,771,762 B2

ENZYMATIC PROCESS TO PRODUCE HIGHLY FUNCTIONAL SOY PROTEIN FROM CRUDE SOY MATERIAL

RELATED APPLICATIONS

The present application is a continuation of U.S. patent application Ser. No. 10/877,552, filed Jun. 25, 2004, now abandoned, which is (1) a continuation-in-part of U.S. patent application Ser. No. 09/939,500, filed Aug. 23, 2001, now U.S. Pat. No. 6,787,173, which was based on and claimed benefit of U.S. Provisional Patent Application Ser. No. 60,250,228, filed Nov. 30, 2000, (2) a continuation-in-part of U.S. application Ser. No. 10/655,158, filed Sep. 4, 2003, now abandoned, and (3) a continuation-in-part of U.S. patent application Ser. No. 10/655,259, filed Sep. 4, 2003, now U.S. Pat. No. 7,045,163, all of which are incorporated by reference in their entireties.

FIELD OF THE INVENTION

This invention relates generally to the processing of soy-derived materials for use in various products. More particularly, the invention relates to a process for producing highly functional soy protein using ultrafiltration followed by an enzymatic treatment.

BACKGROUND

Soybean rich diets have long been touted to have various health benefits, including boosting heart health, serum cholesterol reduction, lowering the risk of cancer, cancerous or tumor cell inhibition, improving woman's bones and health, and stimulation of the immune system. In addition, the soybean amino acid profile is one of the most complete among vegetable protein sources, and resembles (with the exception of sulfur-containing amino acids) the general patterns derived from high-quality animal protein sources. However, soy has not been widely used in various food products because the indigenous problems of soy off flavor, poor solubility and texture.

On Oct. 26, 1999, the FDA accepted scientific evidence that suggests a reduction in the risk of coronary heart disease from soy protein enriched low-fat, low-cholesterol diets, and approved health claims for labeled food products that link intake of at least 6.25 grams of dietary soy protein per reference customarily consumed amount of the food product to a possible reduction in the risk of heart disease. This has intensified efforts to incorporate soy into a wide variety of foods. The benefit of soy protein may be related to its antioxidant activity (see, e.g., Chen et al., *J. Agric. Food Chem.*, 46:49-53 (1998); Chen et al., *J. Agric. Food Chem.*, 43:574-578 (1995); Chen et al., *J. Agric. Food Chem.*, 43:574-578 (1996); Suetsuna, *Jpn. Soc. Nutr. Food Sci.*, 52:225-228 (1999); and Zhang et al., *Ann. NY Acad. Sci.*, 864:640-645 (1998)). By scavenging free radicals and oxidative species generated during the course of in vivo reactions, the peptides may help protect against pathogenic processes involving enzyme inactivation, DNA mutation, and/or protein denaturation (see, e.g., Szweda et al., *J. Biol. Chem.*, 268:3342 (1993); and Reiss et al., *Biochem. Biophys. Res. Commun.*, 48:921 (1972).

While soy is useful in food products, it is well known that soy products have undesirable odors and flavors that must be removed in order to make the soy materials useful. It is believed that lipoxygenases catalyze the oxidation of certain polyunsaturated fatty acids, producing hydroperoxides which are degraded into volatile carbonyl compounds, associated with objectionable odors and flavors in soy-derived materials.

Additionally, while the protein content of soy-derived materials is considered valuable, the soluble carbohydrates are considered undesirable. Their removal from soy protein fractions is an objective in many processes in which the proteins are recovered. Another undesirable compound in soy proteins are phytates, which are calcium-magnesium-potassium salts of inositol hexaphosphoric acid. Such compounds are believed to chelate metal ions and are not readily absorbed by the human body. They are considered to bind to soy proteins and interfere with digestion, thus removal of phytates in soy-derived materials is advantageous.

Generally, untreated forms of soy protein are not readily soluble in aqueous liquids, and are difficult to incorporate into various food products, particularly beverages. Soy proteins often have low solubility at pH values of about 6.5 to about 8.5 and often precipitate out at pH values of about 3.5 to about 6.5, thereby imparting a cloudy appearance and/or a gritty or sandy texture to the target food product. Another major problem associated with soy protein is soy off flavor. Further, untreated soy protein does not generally have significant antioxidant activity although it does contain antioxidant components (e.g., isoflavones) which are associated with or bonded with the soy protein.

Attempts to improve the solubility and other functional properties of soy protein primarily involve hydrolysis. However, soy protein is known to have an undesirable flavor profile, and attempts to hydrolyze soy protein often produce a bitter hydrolysate. While not bound by any particular theory, it is believed that the bitter taste stems from excess low-molecular fractions and accumulated hydrophobic peptides from the hydrolysis. In previous endeavors, undesirable hydrolytic fractions were avoided at the price of substantial processing inefficiencies which reduced the degree of hydrolysis. In other words, the foregoing soy protein hydrolyzing methods avoided low-molecular fractions by early termination of the process, thereby suffering low yields of usable product.

Therefore it would be advantageous to develop a process that hydrolyzes a soy protein to deliver a high yield of soluble protein. Further the soluble protein should contain a high amount of protein (for example, 6.25 g soy protein/serving or higher) that can be introduced into a neutral or low pH product. It would also be advantageous to utilize crude soy material (e.g., defatted soy flour, soy meal after oil extraction, or other soy materials containing significant levels of fiber) in an effective manner to obtain highly functional soy protein which can be used in a variety of food products.

SUMMARY OF THE INVENTION

The present invention provides a method of preparing highly functional soy proteins, said method comprising (1) preparing a basic aqueous mixture of a soy material containing soy proteins; (2) optionally removing insoluble materials (especially particulates) from the basic aqueous mixture; (3) passing the basic aqueous mixture through an ultrafiltration membrane having a molecular weight cutoff in the range of about 1,000 to about 50,000 Daltons (preferably about 10,000 to about 30,000 Daltons), thereby removing soluble carbohydrates and low molecular weight materials; (4) adjusting the pH of the basic aqueous mixture to a level sufficient to allow an enzyme to solubilize the soy proteins; (5) solubilizing the soy proteins by treating the pH-adjusted aqueous mixture with the enzyme for a time sufficient to form the highly functional soy proteins; (6) inactivating the enzyme; and (7) recovering the highly functional soy proteins.

The present invention also provides a method of preparing highly functional soy proteins, said method comprising (1) heating a basic aqueous mixture of a soy material containing soy proteins to a temperature of about 110 to about 140° F. (preferably about 120 to about 130° F.), wherein the basic aqueous mixture has a pH of about 7 to about 11 (preferably about 8 to about 10); (2) removing insoluble materials from the basic aqueous mixture; (3) passing the basic aqueous mixture through an ultrafiltration membrane having a molecular weight cutoff in the range of about 1,000 to about 50,000 Daltons (preferably about 10,000 to about 30,000 Daltons) while maintaining the pH at about 8 to about 10 (preferably about 8.5 to about 9.5), thereby removing soluble carbohydrates and low molecular weight material; (4) adjusting the pH of the basic aqueous mixture to about 6 to about 8 (preferably about 7 to about 8); (5) solubilizing the soy proteins by treating the pH-adjusted aqueous mixture with an enzyme or mixture of enzymes having endoprotease and exopeptidase activities at about 75 to about 140° F. (preferably about 100 to about 130° F.) for a time sufficient to form the highly functional soy proteins; (6) inactivating the enzyme at about 160 to about 200° F.; and (7) recovering the highly functional soy proteins.

The enzymes used in the present invention should, of course, be capable of solubilizing the soy proteins to provide the highly functional soy proteins in a reasonable time (generally within about 3 to about 5 hours or even less). Suitable enzymes include, for example, enzymes or mixture of enzymes having both endo- and exo-peptidase activities.

DETAILED DESCRIPTION

The present invention provides a method for producing highly functional soy protein from an aqueous soy protein mixture or solution using ultrafiltration followed by an enzymatic treatment. The method of this invention can employ crude soy material (e.g., defatted soy flour, soy meal after oil extraction, or other soy materials containing significant levels of fiber) in an effective manner to obtain highly functional soy protein which can be used in a variety of food products For example, the present invention provides a method of preparing a highly functional soy protein, said method comprising: (1) preparing a basic aqueous mixture of a soy material; (2) removing insoluble materials from the basic aqueous mixture; (3) passing the basic aqueous mixture through an ultrafiltration membrane having a molecular weight cutoff in the range of about 1,000 to about 50,000 Daltons (preferably about 10,000 to about 30,000 Daltons), thereby removing soluble carbohydrates and low molecular weight material; (4) adjusting the pH of the basic aqueous mixture to a level sufficient to allow an enzyme to solubilize the soy proteins; (5) solubilizing the soy proteins by treating the pH-adjusted aqueous mixture with the enzyme for a time sufficient to form the highly functional soy proteins; (6) inactivating the enzyme; and (7) recovering the highly functional soy proteins.

Figure 1:
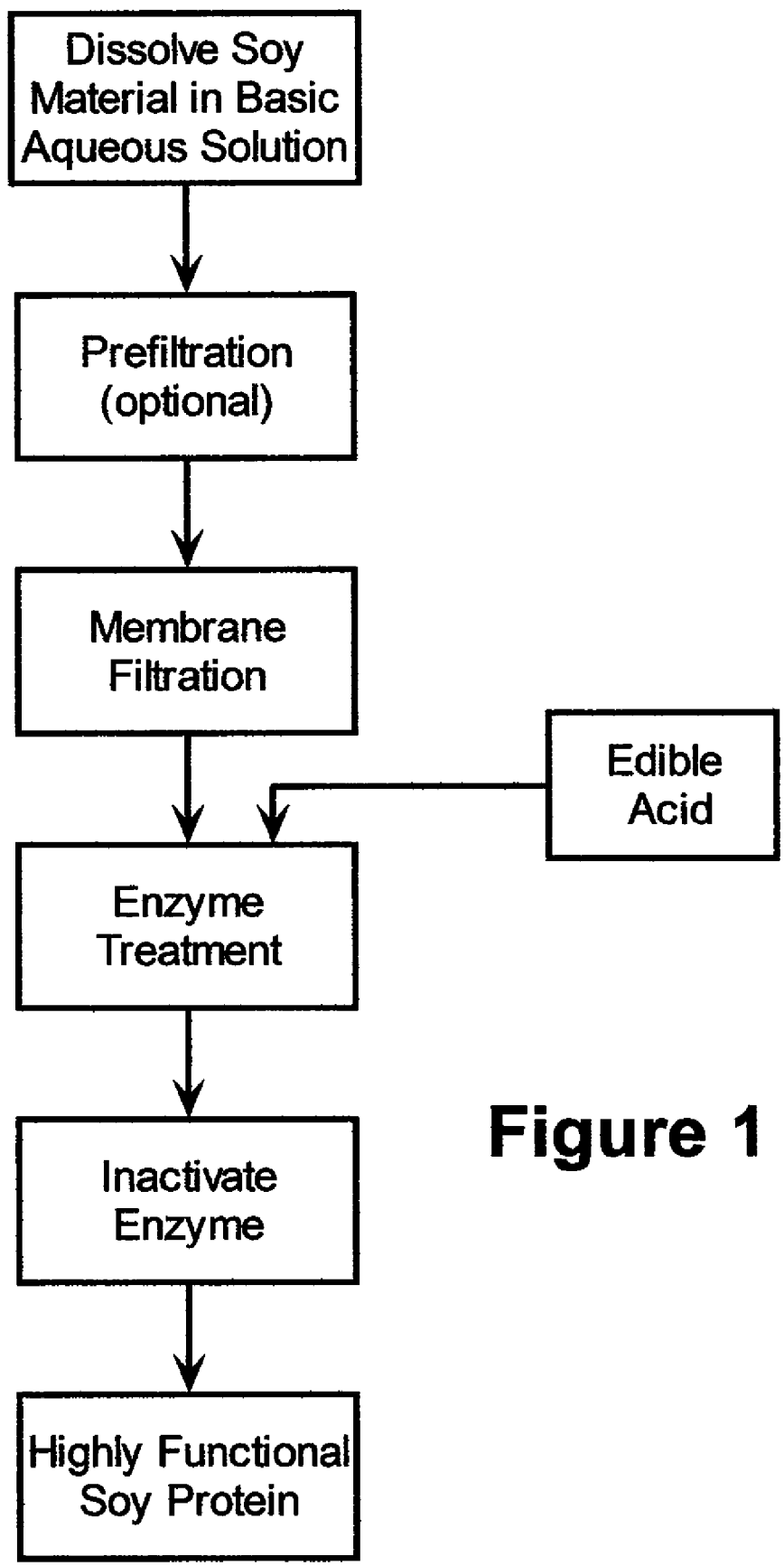
FIG. 1 provides a flowchart illustrating the general method of this invention.

FIG. 1 generally illustrates the present invention whereby a crude soy material can be treated using an membrane filtration process and then enzymatically treated to provide highly functional soy protein. As shown in FIG. 1, a soy material is included in a basic aqueous solution. Preferably, the resulting solution is prefiltered using a crude filtration medium or device (e.g., mesh, sieve, or screen filter, and the like) to remove a substantial portion of insoluble materials (especially the larger insoluble particles or materials) in order to minimize or reduce membrane fouling in the later membrane filtration step. The basic solution is then treated in a membrane filtration unit (preferably an ultrafiltration unit) and then, after adding an edible acid (preferably an edible organic acid) to adjust the pH to a level suitable for the next step, treated with an enzyme to produce the highly functional soy protein.

Figure 2:
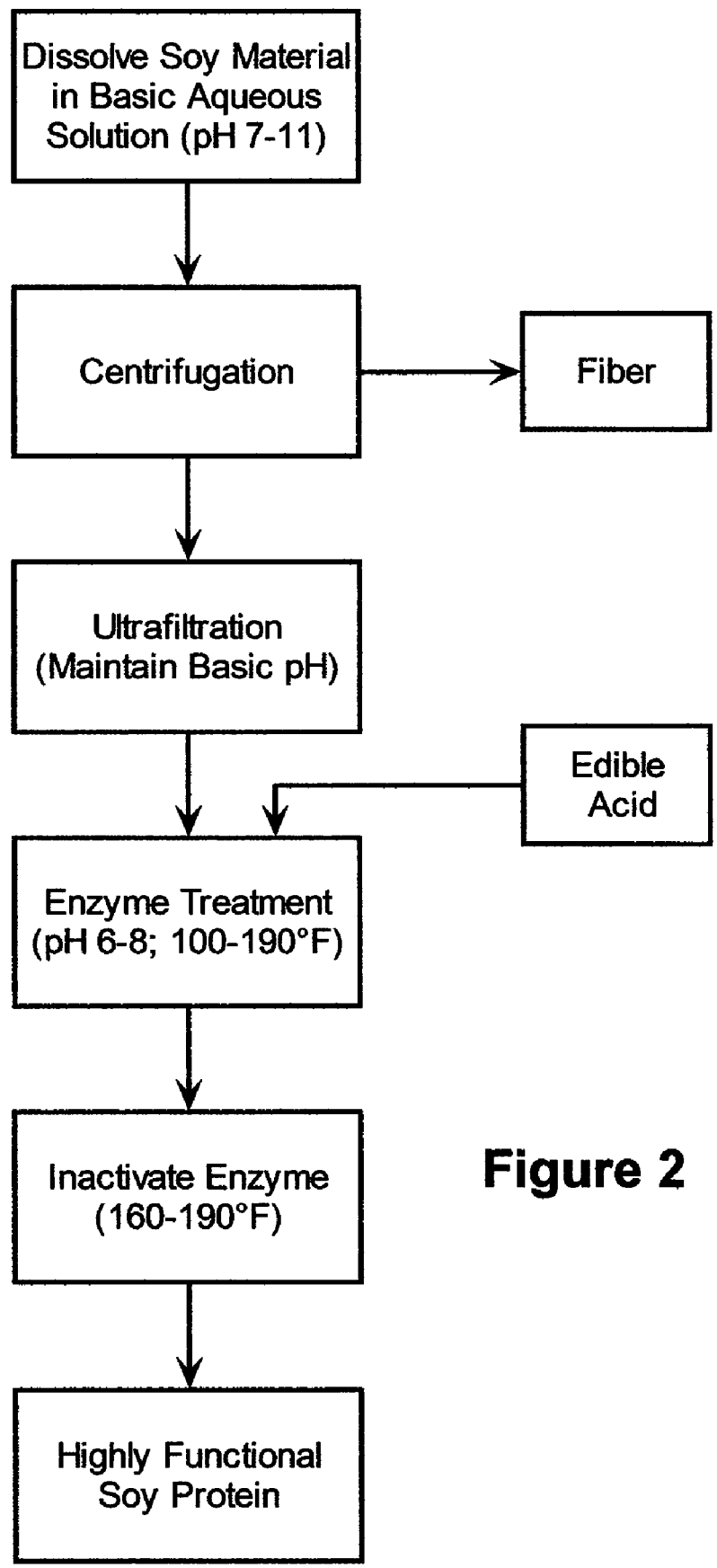
FIG. 2 provides a flowchart illustrating a preferred embodiment of the present invention.

FIG. 2 generally illustrates a preferred embodiment of the present invention wherein a crude soy material is treated using an ultrafiltration process and then enzymatically treated to provide highly functional soy protein. As shown in FIG. 2, a basic aqueous mixture is formed by hydrating a soy material containing soy proteins. The pH of the basic solution is about 7 to about 11, preferably about 8 to about 10, and most preferably about 9 to about 9.8, in order to solubilize the protein content of the soy material. The pH can be adjusted as needed by adding an edible base (e.g., sodium, potassium or calcium hydroxides). The aqueous mixture is filtered through a filtration device (e.g., mesh, sieve, or screen filter, and the like) and/or centrifuged to remove the insoluble materials from the aqueous mixture. If desired, a filtration medium or device can be used before the filtration device shown in FIG. 2 to prefilter the crude soy material. The filtration step or steps are used to minimize or reduce membrane fouling in the later ultrafiltration step as well as remove insoluble soy fibers. The fiber separated in the centrifugation step may be discarded or, if desired, used as a fiber source.

Once the insoluble materials have been removed the mixture is passed through an ultrafiltration system using membranes having a molecular weight cutoff between in the range of about 1,000 to about 50,000 Daltons (preferably about 10,000 to about 30,000 Daltons). The ultrafiltration membranes remove soluble carbohydrates, such as stachyose and raffinose, and low molecular weight material, including astringent and off flavor components, from the aqueous composition. During the ultrafiltration step, the pH is maintained at a basic range (generally about 7 to about 12, preferably about 8 to about 10, and most preferably about 9 to about 9.8) in order to keep the protein solubilized.

After ultrafiltration, the pH of the mixture is adjusted by the addition of an edible acid (e.g., lactic acid, citric acid, phosphoric acid, and the like as well as mixtures thereof) to a level suitable for the enzyme in the later enzyme treatment step; generally a pH of about 6.6 to about 8.0 and preferably about 7.0 to 7.4 is acceptable. If desired, the mixture can be concentrated (either before or after the pH is adjusted). Enzymes are then added to digest, modify, and/or hydrolyze the soy protein. Generally, this enzyme treatment is carried out a temperature of about 100 to about 140° F. (preferably about 110 to about 130° F. for time sufficient to form the desired highly functional soy proteins. Although the length of the enzyme treatment will be dependent on the temperature, generally treatment times of about 0.5 to about 5 hours, and preferably about 1 to about 3 hours, are sufficient. After the enzyme treatment, the enzyme is inactivated, preferably by heating the mixture to about 160 to about 200° F. (preferably about 170 to about 190° F. for at least about 1 minute (preferably about 3 to about 5 minutes).

Figure 3:
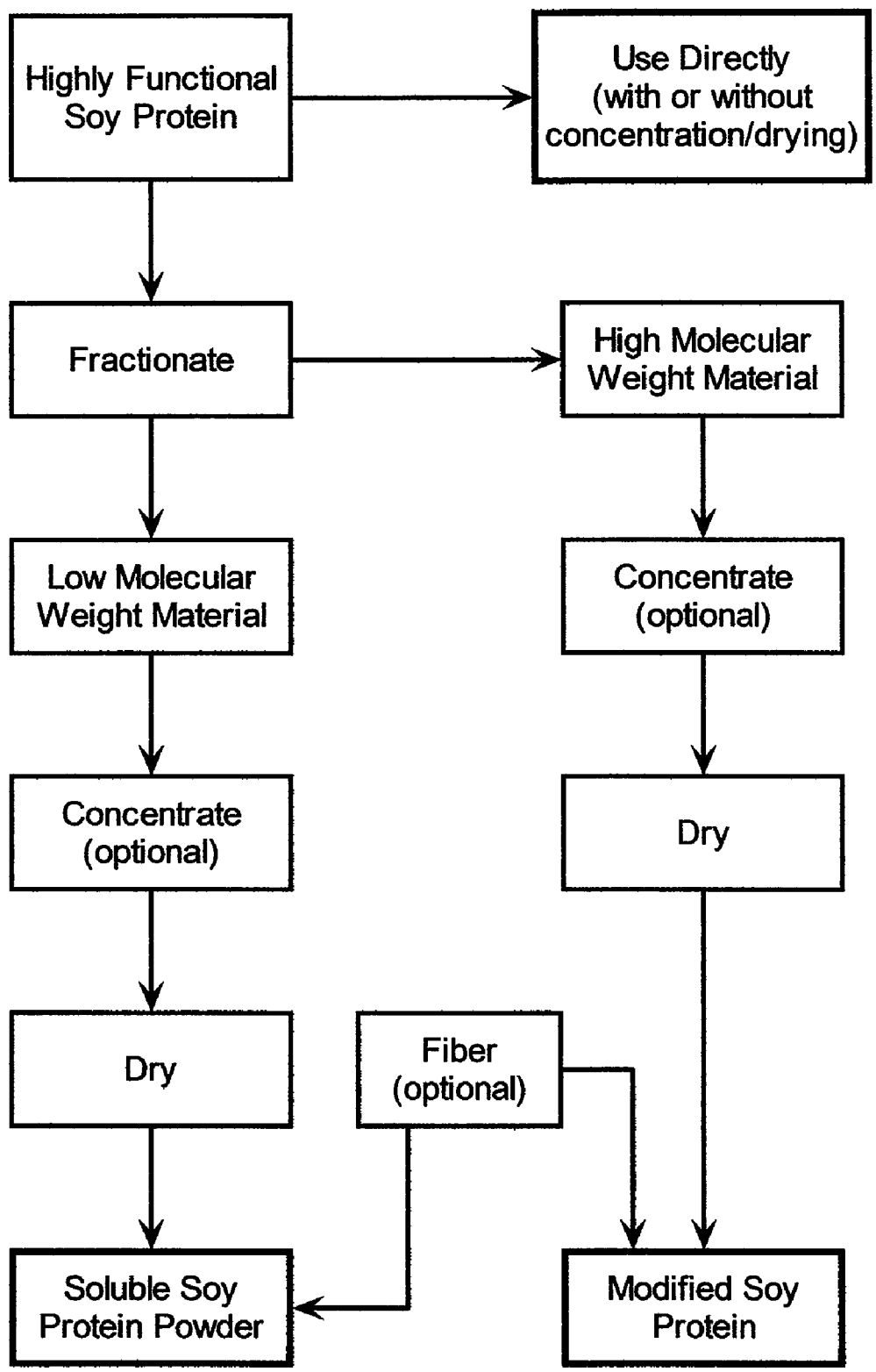
FIG. 3 provides a flowchart illustrating possible post-treatment processing options for the highly functional soy protein obtained in the present invention.

Finally, the highly functional soy proteins are obtained in the enzyme-deactivate aqueous mixture from the enzyme treatment. The highly functional soy proteins may be treated (i.e., post treatment) to obtain an number of different forms depending on the intended or desired use. Representative post-treatment processes are shown in FIG. 3. For example, the aqueous solution containing the highly functional soy protein may be used directly (with or without concentrating) in, for example, cheese-making, cheeses, salad dressings, beverages, cookies, snacks, and the like. Alternatively, the aqueous solution containing the highly functional soy protein may be concentrated (e.g., dryer or evaporator) to form a dried product when can be used in various products. Alternatively, the aqueous solution may be fractionated to form a soluble fraction and an insoluble fraction (with or without adjusting the pH prior to fractionation). The soluble fraction may be dried (either with or without concentrating first) to obtain a soluble soy protein powder. The soluble soy protein powder may preferably be used, for example, in beverages (including dry mixes which can be reconstituted in water to form a beverage and ready-to-drink beverages) since it should be essentially completely soluble in aqueous solution. Such a soluble soy protein powder could be obtained, for example, by spraying drying (preferably after concentrating using, for example, an evaporator), freeze drying, or similar techniques. Alternatively, the soluble fraction may be used directly, with or without concentration, as an aqueous solution. If desired, fiber (included the fiber separated using centrifugation as in FIG. 2) could be added to the soluble soy protein. Generally, the soluble soy protein has a bland flavor, low viscosity, low free amino acid content, high antioxidant capacity, and high solubility at either neutral or low pH product that contains high protein and high fiber. The insoluble fraction may be treated in a similar manner as the soluble fraction to provide a modified soy protein powder having bland flavor. Again, if desired, fiber may be added to the modified protein powder. Such fiber added to the soluble or insoluble factions could be added as is, or pre-homogenized or pre-microfluidized to obtain micro-fragments or micro-particulates The modified soy protein isolate or powder is especially adapted for use in high protein or nutritional bars or snacks. Although not shown in FIG. 3, the pH of the various materials may be adjusted if desired and/or if dictated by the desired end use.

As noted above for a preferred embodiment, an aqueous mixture is formed by hydrating soy soluble proteins by adjusting the pH to about 7 to about 11, preferably to about 9.0 to about 9.8, more preferably to about 9.4 to about 9.6. The aqueous mixture is filtered, preferably using centrifugation, to remove the insoluble materials from the aqueous mixture. Such centrifugation increases the protein levels and aids in keeping the ultrafiltration membrane clear of insoluble materials. The mixture is then passed through an ultrafiltration membrane having a molecular weight cutoff between in the range of about 1,000 to about 50,000 Daltons (preferably about 10,000 to about 30,000 Daltons) while maintaining the basic pH to remove soluble carbohydrates, such as stachyose and raffinose, and low molecular weight materials, such as astringency and off flavor components, from the aqueous composition. After the ultrafiltration, the pH of the mixture is adjusted to about 6.6 to about 8, preferably about 7 to about 7.4 by addition of a suitable acid (preferably an organic acid). An enzyme treatment is then used to digest, modify and hydrolyze the soy protein; generally about 0.5 to about 5 hours, and preferably about 1 to about 3 hours for the enzyme treatment is sufficient. After the enzyme treatment, the enzymes are inactivated and the highly functional soy protein is obtained.

The crude soy material suitable for use as a starting material includes, but is not limited to, soy meal after oil extraction and/or defatted soy materials. Although not preferred, largely due to material costs, soy protein isolate, soy protein concentrate, soy protein extract, soy flour, powdered or dry soy milk, ground soy bean, soy bean paste, and mixtures thereof, may also be used. Generally, the crude soy material has a protein content of about 40 to about 90 percent, and preferably about 50 to about 70 percent.

Removing the insoluble materials or larger particles from the aqueous mixture may be accomplished by centrifugation or a crude filtration device such as a mesh filter. Soluble carbohydrates, including stachyose and raffinose, and low molecular weight components, such as astringency and off flavor components, are removed using an ultrafiltration membrane. The soy proteins are retained by the ultrafiltration membrane while the soluble carbohydrates and lower molecular weight compounds pass through the membrane. In general, the ultrafiltration membrane passes the compounds with molecular weights lower than about 1,000 to about 5,000 Dalton. The ultrafiltration membrane should retain substantially all of the solubilized soy proteins.

Suitable ultrafiltration membrane for use in this invention contain an anisotropic (non-uniform) layer having a skin or coating containing pores which determine the size of molecules which can pass through the membrane which is supported by spongy structure. The skin or coating is the actual filtering or size separating medium. Such membranes are commonly made by coagulation of polymers in an aqueous bath. Typical polymers which are used include polysulfones, cellulose esters, poly(vinyidenefluoride), poly (dimethylphenylene oxide), poly(acrylonitrile), and like materials which can be cast into membranes. Often, the membranes are formed into hollow tubes which are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used; thus, the spongy supporting structure should be uniformly strong so as to prevent the surface skin from breaking and/or otherwise forming holes or other voids which would allow the solution to bypass the surface skin. In addition to the polymeric membranes just described, other materials can be and have been used to make ultrafiltration membranes, such as ceramics, sintered metals, and other inorganic materials; such ultrafiltration membranes can also be used in the present invention.

Ultrafiltration, for example, can be carried out using continuous, semi-continuous, or bath processing. The ultrafiltration membrane permits soluble carbohydrates and lower molecular weight materials to pass through its pores along with water (the permeate) and leaves the higher molecular weight soy materials (the retentate) to be recirculated. Water can added to replace the lost in the permeate and to provide a constant concentration of soy materials in the feed stream supplied to the ultrafiltration membrane. If desired, an additional processing of the permeate can be accomplished to recover a portion of the water using a reverse osmosis membrane for recycling to join the retentate and fresh soy materials. The advantage of such a step is in reducing the amount of fresh water which must be added to the process and removed in concentrating the retentate. Of course, the pH of the soy-derived materials can be kept within the desired range by appropriate addition of a base to the recycled or fresh water added to the process or by direct addition of base as desired. Ultrafiltration is continued until the desired concentration is obtained. Generally, ultrafiltration is continued for an equivalent of about 3 to about 7 washes, preferably about 5 to about 6 washes; a single wash is defined as the amount of permeate collected equal to about half of the starting batch size.

In a batch process, a batch of soy material is placed in a vessel, pH adjusted, optionally subjected to a prefiltration step, and fed to the ultrafiltration membrane. The permeate is separated and the retentate preferably is returned to the vessel for repeated treatment via the ultrafiltration membrane. As the process proceeds, the soy material is depleted of the soluble carbohydrates and lower molecular weight compounds becoming more concentrated in the desirable soy proteins. Periodically, water is added to the retentate to dilute it and provide a carrier for the compounds which are passed through the membrane. In a semi-continuous or continuous process the water is added continuously at the rate it is being removed in the permeate. The process is continued until nearly all of the soluble carbohydrates and lower molecular weight compounds have been removed and the high molecular weight soy proteins remain.

The ultrafiltration membrane is operated with a pressure differential across the membrane which assists migration of the soluble carbohydrates and lower molecular weight compounds, water, and other materials which are capable of passing through the pores of the membrane; of course, the pressure should not exceed the physical strength of the membrane. Typical average pressure for such membranes are about 50 psi (about 345 kPa). The trans-membrane pressure (in versus out) is about 15 psi (about 103 kPa). Of course, these pressures could be varied based on the membrane's specifications and other operational concerns. The flow rate of the feed stream provides sufficient residence time for significant permeate removal, but also is high enough to provide turbulence so that the access of the feed stream to the membrane pores is not significantly hindered by solid deposits on the membrane walls. One skilled in the art will understand that suitable operating parameters will be determined by experience with the materials being separated.

The hydrolysis is carried out using an enzyme or mixture of enzymes, preferably a fungal protease enzyme or a mixture of fungal protease enzymes, having both endo and exo-peptidase activities to hydrolyze soy proteins. This class of enzymes has been found to hydrolyze soy proteins without releasing significant levels of low molecular weight soy protein peptides (i.e., molecular weights less than about 3,000 Daltons and preferably less than about 2,000 Daltons) or free amino acids which may impart bitter taste to the hydrolysate. Generally, the hydrolysate contains at least about 15 percent, and preferably about 20 to about 45 percent, soluble soy protein and is substantially free of low molecular weight soy protein peptides. The term "substantially free of low molecular weight protein peptides" means a level such that a bitter taste is not developed in the resulting hydrolysate. Generally, such substantially free of low molecular weight soy protein hydrolysate contains less than about 5 percent of low molecular weight peptides (i.e., having molecular weight less than about 3,000 Daltons) and less than about 5 percent, preferably less than about 3 percent, and more preferably less than about 1 percent, free amino acids. Protein solubility can be determined as described in Franzen et al., *J. Agric. Food Chem.*, 24, 788795 (1976), which is hereby incorporated by reference.

The enzymes or mixture of enzymes used in the present invention have both endo- and exo-peptidase activities. Preferably the enzymes used in the present invention comprise a fungal protease enzyme or a mixture of fungal protease enzymes having both endo- and exo-peptidase activities. Such fungal protease enzymes are commercially available. Examples of suitable fungal protease enzymes include, but are not limited to, Corolase PN-L (AB Enzymes, Finland; a fungal proteinase produced from *Aspergillus sojae* with high levels of endo- and exo-peptidase activities); Flavourzyme 500L (Novozymes North America Inc., Franklinton, N.C.; a fungal protease/peptidase complex produced from *Aspergillus oryzae* and which contains both endoprotease and exopeptidase activities); Fungal Protease 500,000 and Fungal Protease Concentrate (Genencor International, Rochester, N.Y.; *Aspergillus oryzae* fungal protease preparations with both endo and exo-peptidase activities).

As noted above, the present invention can provide fractionated soy materials, namely a soluble soy protein material (generally containing a slightly lower molecular weight fraction) and modified soy protein material (generally containing a high molecular weight fraction). The soluble soy protein material generally has a bland flavor, low viscosity, low free amino acid content typically less than about 7.5 percent, high antioxidant capacity, and high solubility at either neutral or low pH in the range of about 2 to about 6.5. The modified soy protein material has a bland flavor. If prepared from soy meal or soy flour without removing fiber, it typically has a high fiber content typically in the range of about 25 to about 35 percent fiber. The soy proteins produced from this process allows delivering of high soy protein in many products without adding soy off-flavor and bitter taste. The soluble soy protein material can, for example, can be incorporated into low or neutral pH products such as beverages, dressings, sauces, baby formulas, coffee, cereal, protein bars and the like to provide a high amount of protein per serving (e.g., about 6.25 grams or more of soy protein/serving). The modified soy protein material, as well as the unfractionated soy protein material, is preferably used in non-beverage type products to provide similar levels of soy protein. Also, this process removes anti-nutritional components including stachyose and raffinose.

The fractionated soy materials can be obtained using known methods including, for example, centrifugation, filtration, and the like; generally centrifugation is the preferred technique. Generally, the insoluble fraction will have a higher average molecular weight than the soluble fraction. Once separated, the solution containing the soluble soy proteins can be utilized in food applications as is or is further processed into a powdered form for use in food applications. Generally, the soluble fraction is substantially free of low molecular weight soy peptides (typically less than about 15 percent of low molecular weight peptides having a molecular weight of less than 3 kDa) and having only low levels of amino acids (typically less than about 7.5 percent and preferably less than about 5 percent). Generally the soluble soy protein fraction comprises peptides having an average molecular weight of about 3 to about 30 kDa. Generally, the soluble fraction is soluble in an aqueous medium having a pH of about 2 to about 9.

The insoluble soy protein fraction contains insoluble or modified soy proteins. Due to its low solubility, this fraction is preferably used in semi-solid or solid food products (e.g., pasta, cereal, nutritional bars, cookies, snacks, and the like). The insoluble soy protein fraction, especially when prepared from deflavored soy materials such as soy flour, can provide a good source of soy protein and fiber.

The invention is further described by the examples below. It should be recognized that variations based on the inventive features disclosed herein are within the skill of the ordinary artisan, and that the scope of the invention should not be limited by the examples. To properly determine the scope of the invention, an interested party should consider the claims herein, and any equivalent thereof. In addition, all citations herein are incorporated by reference, and unless otherwise expressly stated, all percentages and ratios are by weight.

Example 1

Defatted soy flour (15 lbs) from Central Soya (Fort Wayne, Ind.) was dispersed in 285 lbs hot water (about 120° F.) in a mixing tank. The pH of the dispersion was adjusted to 9.0 using a NaOH solution. The dispersion was then passed through a 100 mesh filter to remove large particles. The dispersion (250 lbs) was then filtered through an ultrafiltration membrane having a molecular weight cutoff of 10,000 Daltons in a semi-continuous batch operation. The soy remaining in the filter or the retenante was re-circulated and concentrated to about half of the original volume. Then an equal volume of fresh water was added to the batch at the same rate as the permeate. This process was continued for an equivalent of 5 washes. The dry material obtained right after ultramembrane filtration is referred to as deflavored soy flour.

After the ultrafiltration process was complete, the pH of the retenate was adjusted to pH 6.8 at a temperature of 100-125° F. by adding citric acid. The resulting retenate was concentrated to 90 lbs (about 10 percent solids). If desired, the pH can be adjusted after this concentration step. The dispersion was transferred to a jacketed tank equipped with agitation and temperature control. An enzyme mixture (ratio of about 3:1 of Fungal Protease Concentrate from Genencor, Rochester, N.Y., and Corolase PN-L from AB Enzyme, Columbus, Ohio) in the amount of about 0.4 percent, based on the weight of the soy protein in the reactor, was added. Enzyme hydrolysis was carried out at a temperature of 122° F. for 1 hour. After enzyme hydrolysis was completed, the temperature was raised to 186° F. to inactivate the enzyme.

The heat treated dispersion was cooled to below 100° F. and centrifuged to separate the supernatant from the pellet (unsoluble materials). If desired, centrifugation could be carried out after adjusting pH of the dispersion to about 4 to about 5, preferably about 4.4 to about 4.6. The centrifugation/separation can be carried out in batch or continuous mode so long as it is sufficient to separate supernatant from pellet/sludge; multiple centrifugation runs could be used if desired. The collected supernatant was freeze dried. The soluble soy protein was obtained after drying the supernatant. The insoluble pellet (containing modified soy protein with high levels of protein and fiber) collected after centrifugation can be dried and re-dispersed in water without or with adjusting pH to 6.8 to 7.4.

Example 2

A deflavored soy flour (2.59 kg; similar to the deflavored soy flour obtained in Example 1) was dispersed in water in a jacketed mixer to provide an aqueous solution containing 15.6 percent solids. The dispersion was heated to 120° F. and the pH adjusted to 7.6 with 5N NaOH. Fungal proteases (8.86 gm; ratio of about 3:1 of Fungal Protease Concentrate from Genencor, Rochester, N.Y., and Corolase PN-L from AB Enzyme, Columbus, Ohio)) was added and hydrolysis was carried out at 120° F. for 3 hours. The temperature was raised to 186° F. and for 1 minute to inactivate the enzyme. The hydrolysate was then cooled to below 100° F. and pH was adjusted to 4.53 with a 14 percent citric acid solution. The soluble was separated from the insoluble fraction by centrifugation. The soluble fraction was freeze dried to provide about 1.3 kg of soluble soy protein. The insoluble fraction (i.e., pellet obtained from the centrifugation) was re-suspended in water and adjusted to pH 7.0 with 5N NaOH. The re-suspended insoluble fraction was freeze dried to obtain about 2.1 kg of modified soy protein.

Example 3

Defatted soy flour (50 lb; ADM 063-130) was dispersed in 450 lb hot water (100-120° F.) in a mixing tank; 20 percent NaOH was slowly added to adjust the pH to 9.5. After stirring for 15-20 minutes, the slurry was filtered through a mesh filter to remove large particles. The filtered slurry was subjected to diafiltration with an ultrafiltration membrane (cutoff 10,000 Dalton) in a semi-continuous batch operation. The soy remaining in the filter or the retenante was re-circulated and concentrated to about half of the original volume. Then an equal volume of fresh water was added to the batch at the same rate as the permeate. This process was continued for equivalent of about 5 washes. The slurry was concentrated to 10 percent solids and the pH was adjusted to 7.2 with diluted citric acid. The pH adjusted slurry was transferred into a jacketed kettle and heated to 120-122° F. Fungal proteases (113 gm; about 0.7 percent; ratio of about 3:1 of Fungal Protease Concentrate from Genencor, Rochester, N.Y., and Corolase PN-L from AB Enzyme, Columbus, Ohio) were added and the hydrolysis was carried out for one hour. Then the temperature was immediately raised to 180-186° F. and maintained at that temperature for 2 minutes to inactivate enzymes. The heated hydrolysate was then cooled to below 100° F. and the pH adjusted to 4.5 by lactic acid. The low pH hydrolysate was pumped through a continuous centrifuge (Westfalia) at 10,000-15,000 rpm for 3 to 4 runs. The supernatant was collected and concentrated by turba-film evaporator. Soluble soy protein was obtained after spray-dry of the concentrated supernatant. The pellet collected from the centrifuge was dispersed in water and spray-dried to give the modified soy protein.

Example 4

Defatted soy flour (22 lbs) from Archer Daniels Midland was dispersed in 270 lbs of water in a jacketed mixing tank with vigorous agitation using an overhead mixer at high speed. Then NaOH was added slowly to adjust the pH to 9 to 10. The batch was then mixed for 20 minutes at 120-130° F. and then the slurry pumped through a continuous centrifuge (Westfalia) at 10,000-15,000 rpm. The supernatant was collected as the supernatant stream and the sludge (crude fiber) was continuously collected as a separate stream. The collected supernatant stream may be passed a second time through the centrifuge to further remove any remaining crude fiber. The supernatant stream was then diafiltered through an ultrafiltration membrane in a semi-continuous batch operation. The soy remaining in the filter or the retenate was re-circulated and concentrated to about half of the original volume. Then an equal volume of fresh water was added to the batch at the same rate as the permeate. This process was continued for equivalent of about 5 washes. The dry material obtained after ultrafiltration is deflavored soy protein extract.

Following steps similar to Example 1, the process produces soluble soy protein and a modified soy protein. The soluble soy protein is expressed as a low molecular weight product produced at near neutral or low pH. The modified soy protein is a high protein and low fiber product, which has a high molecular weight.

Example 5

Deflavored soy protein extract (64 g; protein 89 percent) from Example 4 was dispersed in water and the pH adjusted to 7.6 at room temperature. The dispersion was heated to 122° F. and 0.5 percent of fungal proteases enzymes (0.8 g Fungal Protease Concentrate from Genencor, Rochester, N.Y., and 0.27 g Corolase PN-L from AB Enzyme, Columbus, Ohio) was added to hydrolyze soy protein. The hydrolysis was carried out for 2.5 hours at about 122° F.; the enzymes were then inactivated at 180-190° F. for about 1-2 minutes. Lactic acid and citric acid were used to adjusted the pH to 4.5. The soluble and insoluble fractions were separated by batch centrifuger. Soluble soy protein (24 g; protein 73 percent) was obtained from the soluble fraction after freeze-drying. Modified soy protein was obtained after resuspension and freeze-drying of the insoluble fraction.

We claim:

1. A method for preparing highly functional soy proteins, said method comprising
   (1) preparing a basic aqueous mixture of a soy material containing soy proteins, the basic aqueous mixture having a pH of about 8 to about 10;
   (2) optionally removing insoluble materials from the basic aqueous mixture;
   (3) passing the basic aqueous mixture through an ultrafiltration membrane having a molecular weight cutoff in the range of about 1,000 to about 50,000 Daltons while maintaining the pH of the basic aqueous solution at about 8 to about 10 during ultrafiltration, thereby removing soluble carbohydrates and low molecular weight materials;
   (4) adjusting the pH of the basic aqueous mixture to a level sufficient to allow an enzyme or mixture of enzymes having endoprotease and exopeptidase activities to solubilize the soy proteins;
   (5) solubilizing the soy proteins by treating the pH-adjusted aqueous mixture with the enzyme or mixture of enzymes having endoprotease and exopeptidase activities for a time sufficient to form the highly functional soy proteins;
   (6) inactivating the enzyme or mixture of enzymes; and
   (7) recovering the highly functional soy proteins.

2. The method of claim 1, wherein the soy material is a crude soy material.

3. The method of claim 2, wherein the crude soy material is defatted soy flour or oil-extracted soy meal.

4. The method of claim 1, wherein insoluble materials are removed from the basic aqueous mixture prior to passage through the ultrafiltration membrane.

5. The method of claim 1, wherein the pH of the basic aqueous mixture prior to passage through the ultrafiltration membrane is about 9 to about 10.

6. The method of claim 1, wherein the pH of the basic aqueous mixture in step (4) is adjusted to about 6.8 to about 8.

7. The method of claim 1, wherein the enzyme or mixture of enzymes is present in step (5) at about 0.05 to about 2 percent.

8. The method claim 1, wherein the enzyme or mixture of enzymes is present in step (5) at about 0.25 to about 1 percent.

9. The method of claim 7, wherein step (5) is carried out at a temperature of about 75 to about 140° F. and has a duration of about 0.5 to about 5 hours.

10. The method of claim 8, wherein step (5) is carried out at a temperature of about 120 to about 125° F. and has a duration of about 1 to about 3 hours.

11. The method of claim 1, wherein the recovered the highly functional soy proteins are separated into a soluble fraction and an insoluble fraction.

12. A method for preparing highly functional soy proteins, said method comprising
    (1) heating a basic aqueous mixture of a soy material containing soy proteins to a temperature of about 100 to about 130° F., wherein the basic aqueous mixture has a pH of about 8 to about 10;
    (2) removing insoluble materials from the basic aqueous mixture;
    (3) passing the basic aqueous mixture through an ultrafiltration membrane having a molecular weight cutoff in the range of about 1,000 to about 50,000 Daltons while maintaining the pH at about 8 to about 10, thereby removing soluble carbohydrates and low molecular weight material;
    (4) adjusting the pH of the basic aqueous mixture to about 6 to about 8;
    (5) solubilizing the soy proteins by treating the pH-adjusted aqueous mixture with an enzyme or mixture of enzymes having endoprotease and exopeptidase activities at about 75 to about 140° F. for a time sufficient to form the highly functional soy proteins;
    (6) inactivating the enzyme at about 160 to about 200° F.; and
    (7) recovering the highly functional soy proteins.

13. The method of claim 12, wherein the soy material is a crude soy material.

14. The method of claim 13, wherein the crude soy material is defatted soy flour or oil-extracted soy meal.

15. The method of claim 12, wherein the pH of the basic aqueous mixture prior to passage through the ultrafiltration membrane is about 9 to about 10 and wherein the pH of the basic aqueous mixture is maintained at about 9 to about 9.8 during ultrafiltration.

16. The method of claim 12, wherein the enzyme or mixture of enzymes is present in step (5) at about 0.05 to about 2 percent and wherein step (5) is carried out at a temperature of about 100 to about 130° F. and has a duration of about 0.5 to about 5 hours.

17. The method claim 12, wherein the enzyme or mixture of enzymes is present in step (5) at about 0.25 to about 1 percent and wherein step (5) is carried out at a temperature of about 100 to about 130° F. and has a duration of about 0.5 to about 5 hours.

18. The method of claim 12, wherein the recovered the highly functional soy proteins are separated into a soluble fraction and an insoluble fraction.

* * * * *

UNITED STATES PATENT AND TRADEMARK OFFICE
CERTIFICATE OF CORRECTION

PATENT NO. : 7,771,762 B2  Page 1 of 1
APPLICATION NO. : 12/191954
DATED : August 10, 2010
INVENTOR(S) : Gao et al.

It is certified that error appears in the above-identified patent and that said Letters Patent is hereby corrected as shown below:

Title page, Item (75) (Inventors), Line 1, delete "Edison, NJ" and insert -- Lansdale, PA --.

- In Col. 1, Line 13, delete "60,250,228," and insert -- 60/250,228, --.

- In Col. 1, Line 14, after "U.S." insert -- patent --.

- In Col. 12, Line 4, Claim 8, after "method" insert -- of --.

- In Col. 12, Line 53, Claim 17, after "method" insert -- of --.

Signed and Sealed this

Twenty-third Day of November, 2010

David J. Kappos
*Director of the United States Patent and Trademark Office*